United States Patent [19]

Poubeau

[11] 4,263,819

[45] Apr. 28, 1981

[54] INERTIAL METHOD OF CENTERING A CONSTANTLY CIRCULAR RIM ON ITS HUB AND CORRESPONDING ROTARY DEVICE

[75] Inventor: Pierre Poubeau, Le Pecq, France

[73] Assignee: Societe Nationale Industrielle Aerospatiale, France

[21] Appl. No.: 68,800

[22] Filed: Aug. 22, 1979

[30] Foreign Application Priority Data

Aug. 29, 1978 [FR] France ............................. 78 24955

[51] Int. Cl.³ ..................... F16F 15/22; F16F 15/30
[52] U.S. Cl. ............................... 74/573 R; 29/407; 73/468; 233/23 A
[58] Field of Search ............... 74/572, 573 R, 574; 29/407; 73/468, 469, 458; 233/23 A

[56] References Cited

U.S. PATENT DOCUMENTS

| | | | |
|---|---|---|---|
| 2,731,833 | 1/1956 | Jones | 73/469 X |
| 2,757,050 | 7/1956 | Weber et al. | 74/572 X |
| 3,488,998 | 1/1970 | Bonsor | 73/458 X |

FOREIGN PATENT DOCUMENTS

| | | | |
|---|---|---|---|
| 132548 | 9/1901 | Fed. Rep. of Germany | 74/572 |
| 2622295 | 12/1977 | Fed. Rep. of Germany | |
| 336561 | 3/1904 | France | 74/572 |
| 2232737 | 3/1976 | France | |
| 52-1282 | 1/1977 | Japan | 74/573 R |
| 43220 | 2/1908 | Switzerland | 74/572 |

Primary Examiner—C. J. Husar
Assistant Examiner—Moshe I. Cohen
Attorney, Agent, or Firm—Karl W. Flocks

[57] ABSTRACT

The invention relates to an inertial method and device enabling the centering of a circular rim on its hub to be ensured and giving a practical solution to the problem of the static and dynamic balancing of rotors. The device comprises a rim, a hub, at least one linking arm with two branches passing around the hub. Masses localized at the ends of the arms ensure, in the course of rotation, the holding fast, by pressure, of the arm to the rim, on the one hand, and by traction on the branches on the other hand, of the arm to the hub. Anisotropic masses distributed between the arms keep the circularity of the rim constant. Electro-mechanical means ensure the static and dynamic balancing of the arm-rim-hub assembly. The invention may be used for the rotors of kinetic energy storage system.

11 Claims, 2 Drawing Figures

INERTIAL METHOD OF CENTERING A CONSTANTLY CIRCULAR RIM ON ITS HUB AND CORRESPONDING ROTARY DEVICE

BACKGROUND OF THE INVENTION

1. Field of the Invention

The present invention relates to a method of centering a constantly circular rim on a hub and the rotary device which corresponds to it.

2. Description of the Prior Art

Systems of storing kinetic energy lead to the development of rotors whose useful element is constituted by a rim driven at high peripheral speed in order to obtain a high kinetic energy per unit of mass.

Thus, rotors, in their present most developed form, are constituted by several functional elements:

the central portion or hub supported by magnetic suspension, and the magnetic circuit of the motor, the rim which constitutes the largest part of the moment of inertia, the linkages by arms between the central portion or hub and the rim, the static and dynamic balancing means.

Several difficult problems however underlie the operation of such systems of storing kinetic energy.

The high centrifugal stresses in the rim which undergoes an elongation whose value exceeds the deformation limit occuring in current devices;

Certain constructions which may be considered thus lead to relative elongations of the rim which can reach 3% whilst the improvement in the breaking stress characteristics and in the continuous operation of composite materials even leads to the possibility of elongations reaching or exceeding 5%;

Rigid fastening of the rim or hub thus becomes almost impossible for several reasons connected with the fact that it is not firstly possible to contemplate carrying out this fastening by a bolt or other systems cutting the fibers of composite materials or destroying the homogeneity of the rim, for example of fused silica, and that subsequently the linking arms undergoing themselves considerable centrifugal stresses but different from that of the rim lead, for the same material and for a uniform cross-section, due to an elongation substantially one third of that of the rim whence a tendency to breakage under tensile stress in the arm-hub and arm-rim connecting zones and this, whatever the type of linkage concerned.

In the same way, the methods of fastening by "friction" between arm and rim contemplated in certain cases to absorb the expansion of the latter, cannot be retained on account of the impossibility of preserving the centering of the rotor in the course of rotation.

To this lack of suitable means for connecting the rim to the hub, must be added considerations of stability of the static and dynamic balancing, which amounts to maintaining, for all rotary speeds, coincidence between the axis of the rotor centering systems and the axis of inertia of said rotor; which coincidence must be kept stable despite the elongation of the rim of the rotor under centrifugal stresses as well as the variations in temperature and the cumulative effect of these parameters with the aging effect.

Lastly, the lift in the gravitational field of the rim whose mass can exceed 100 tons, requires a particular conformation of the rotor.

For certain applications, Applicant studied previous types of rotors with a sub-circular conformation in which the central portion of the rotor was provided with radial arms on which was wound, in a polygonal shape, a filamentary material constituting the rim.

On rotation, the rim takes up in these cases, under the effect of centrifugal forces, a shape comprised between a polygon and a circle, the resultant of the forces connected with the tension in the filament then always being directed towards the axis, resulting thus in compression of the arms.

If the shape of the rim were initially circular, the centrifugal force would introduce an elongation of the material involving a fastening on the arms, difficult or impossible to realize, which would make the latter work in extension, an effect adding to the elongation that they undergo themselves according to the previously explained system.

The optimization of such a configuration leads to an initial shape comprised between the polygonal shape and the limit of sub-circularity in order to still ensure compression on the arms.

Two rotors of this type were constructed in 1972 and tested up to 18,000 rpm; one was of steel wire wound on a hub with radial arms of light alloy, the other, of steel strip wound on the same type of hub.

Save for some limited applications, rotors with a sub-circular conformation present a certain number of drawbacks connected with the fact that the alternate flexions of the rim, at the rhythm of the variations in rotary speed, fatigue the material in the zones where it is supported on the radial arms and that it is difficult to position a device at the level of the rim, to cancel the static and dynamic unbalance.

Accordingly, it is an object of the present invention to provide a method of centering a circular rim on its hub, which does not present the aforesaid drawbacks and which offers in addition a practical solution to the problem of this static and dynamic balancing of rotors.

BRIEF DESCRIPTION OF THE DRAWINGS

The invention will, in any case, be well understood from the description which follows, in conjunction with the accompanying drawings, which will include by way of example, a possible embodiment of the method in accordance with the invention.

In the drawings.

Figure 1:
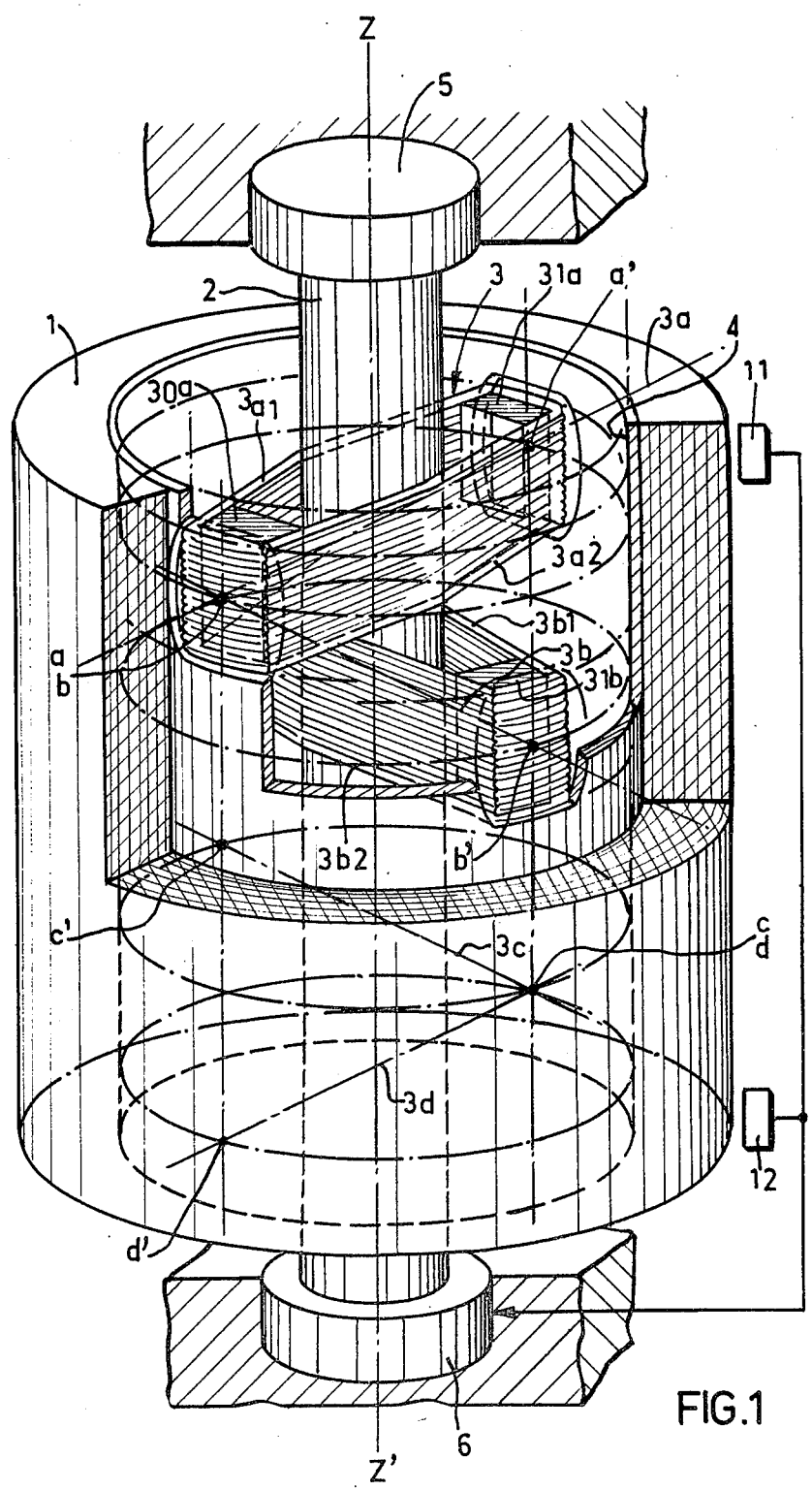
FIG. 1 is a diagrammatic perspective view, with a portion torn away, showing the arrangement of the various elements for practising the invention.

Any design applying rotors must involve a method of linkage between the rim and the hub enabling in addition the centering thereof.

If in a theoretical view regarding the structure of rotors, one considers a thin rim of radius R and of diameter D centered at O and a thin bar of length AB=D centered at C on which the rim rests and one examines the elongations of the rim and the bar for equal rotary speeds involving the same peripheral speeds for the rim and for the ends A and B of the bar, by assuming, for explanation and without this being a construction stress, that the rim and the bar are constituted of materials having the same density $\rho$ and the same modulus of elasticity E, it is seen that:

The stress in the rim j is then $\sigma_1 = \rho V^2$ where V is the peripheral speed of the rim and that the corresponding elongation is:

$$(\Delta R)j = \frac{\rho}{E} V^2 R \quad (1)$$

The stress in the bar b, zero at A and B, increases to a maximum at C whose value is:
$\sigma_2 = \frac{1}{2}\rho V^2$ whilst the elongation on the radii CA=CB=R takes the value:

$$(\Delta R)_b = \frac{1}{2} \frac{\rho}{E} V^2 R \quad (2)$$

Comparison of the relationships (1) and (2) shows that it is not possible to center the rim by the bar without introducing linkages at A and B, which will themselves introduce stresses to ensure the coincidence of the bar-rim contact points.

These linking stresses have numerous drawbacks of different types:

the almost impossibility of constructing these linkages without altering or deteriorating the characteristics of the rim, such as cuts in the fibers of composite materials, etc.;

the introduction of deformations of the rim at the level of these linkages whence additional bending and fatigue stresses of the material related to the speed cycles.

GENERAL DESCRIPTION OF THE INVENTION

In accordance with the method of the invention, localized masses K and K' of the same value m are made fast to the bar, at its ends A and B. In rotation, these masses are subject to centrifugal forces:

$$FA = FB = m \frac{V^2}{R}$$

and the bar thus undergoes an additional elongation.

The total elongation of the bar under the effect of the centrifugal forces applied to its elements, combined with the traction of the localized masses K and K', becomes, at the radius, equal to that of the rim if:

$$m_o = \frac{2}{3} \rho s R$$

where s is the cross-section of the bar.

If m takes a value higher than $m_o$, the bar tends to lengthen more than the rim, which results in the localized masses K and K' exerting pressure on the rim. This pressure can easily be regulated to the desired value for a given speed by adjusting the separation $\Delta_m$ of m with respect to $m_o$.

However, and without particular precaution, the pressure of the arms of the bar on the rim can lead to an alteration in circularity according to the rotary speed.

To this end, the method according to the invention provides also an arrangement of masses distributed supported equally over the whole inner surface of the rim, outside of the supporting areas of the arms, so that the centrifugal force supplied to this said mass places it in uniform pressure on the rim, in order that the circularity is thus preserved whatever the rotary speed contemplated.

The pressure thus exerted on the inside of the rim has another advantage which becomes all the more significant as the configuration departs from that of the thin rim.

In fact, in the case where the rim is thick, the inner layers of the material undergo weaker centrifugal stresses than the outer layers and the radial stresses resulting therefrom reduce the performance of the whole.

By increasing the circumferential stress in the inner layers of the rim, the resulting pressure of the arms and of the distributed load reduces or can even cancel, if necessary, the radial stress which tends to dissociate the outer layers from the inner layers according to a well-known so-called "delaminating" effect.

An adjustment of the parameters permits, of course, the placing of the rim under constant circumferential stress conditions and weak or even zero radial extension stress or compression conditions.

In addition, the choice of the anisotropy of the material, constituting the distributed mass, can enable also the reinforcement of the axial mechanical characteristics, for example, of a rim which is long with respect to its diameter.

DESCRIPTION OF PREFERRED EMBODIMENTS

Figure 2:
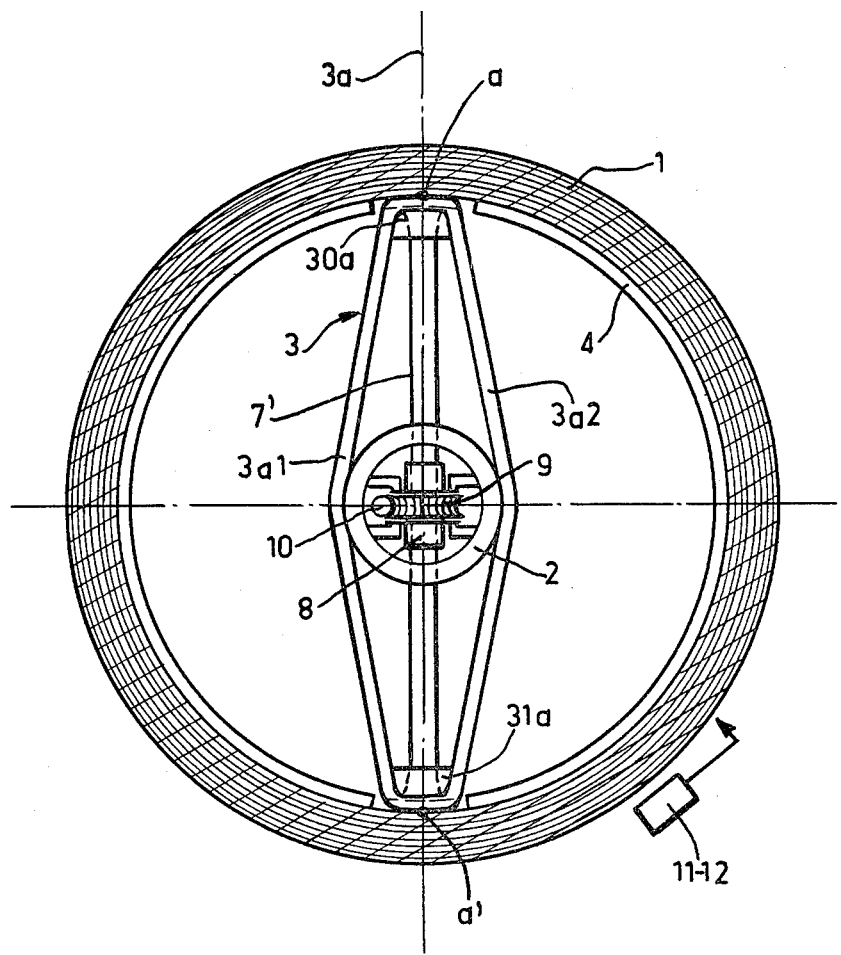
FIG. 2 is a diagrammatic plan view showing more particularly the positioning of the balancing means.

If reference is made to FIGS. 1 and 2, it is seen that the device according to the invention is characterized, according to its essential constituent elements, by a rim 1, a hub 2 and at least one linking arm such as 3 supported internally on the rim 1 and which includes localized masses such as 30a, 31a at its ends.

The thus-constituted rotor assembly is completed, normally, by the upper suspension system 5 and the lower suspension system 6 which can include also the rotor drive or power recovery system as well as the balancing device which will be discussed below.

The suspension systems may be, in a developed form, of the magnetic bearing type and the generator motor of the ironless permanent magnet type.

In the form shown in FIG. 1 and which relates to a large size rotor, the arms are four in number in alternate orthogonal arrangement and the points effecting the contact of the centers of the support surfaces of the arms 3a, 3b, 3c, 3d with the inside of the rim are marked a, a'—b,b'—c,c' and d,d' whilst the localized masses are themselves marked 30a, 31a, 30b, 31b, . . . .

The conformation of each of the arms 3, as shown in FIGS. 1 and 2, permits an important feature of the invention to appear.

In fact, the wire or lamina form used or more generally the conformation of an anisotropic material used to constitute each arm branch 3a1, 3a2, 3b1, 3b2 is utilized to pass around both the localized masses 30a, 31a, . . . and the hub 2.

In a way, the tensile stresses appearing in each arm branch and which are the best suited to the filamentary or laminar material concerned are exploited to "grip" the hub and thus constitute the principle itself of the mechanical performance of the assembly.

In the course of rotation, the centrifugal forces appearing in the localized masses in fact place the branches of the arms in traction and the thus-generated stresses cause the appearance of two resultants directed towards the axis of rotation Z,Z' and through this fact is manifested during the whole time of rotation.

The invention relates notably in this case to defining a method of linkage by arms between a rim and a hub and it is of little importance to consider the mode of construction of this rim which is circular in constitution and which must remain so.

Thus, any means of rim construction may be envisaged, whether it is of the filamentary, laminar or even monolithic type.

Quite evidently, the linking zones around the points a,a', b,b', c,c', d,d' are initially formed by gluing but the latter method only constitutes a useful addition to ensure the holding of the rim during the periods of arrest of the rotation.

In a preferred embodiment and in the present state of the art, the various elements may advantageously but not exclusively be constructed in various ways:

The rim is of a circumferential winding of the filamentary type, glass fiber, carbon polyimide or polyamide, boron filament, steel wire or strip or even of a monolithic material such as fused silica, high strength steel, etc.

The localized masses are of a very dense material such as lead, impoverished uranium, steel, ... in the solid form, of wires or of fabrics in an organic or metallic binder or in powder form in an organic or metallic binder.

The distributed masses 4 are of materials constituted by a fabric of fibers mechanically stronger in a direction parallel to the axis of rotation and hence anisotropic, coated in a binder and thus forming a body by gluing with the rim, said binder being capable of having a relatively low modulus so as to constitute, in directions other than longitudinal, a flexible material. This fabric must be perforated on a level with the arm-rim linking zones.

The arm may be of a material having a very high modulus and a density less than that of the rim whilst preserving a capacity for elongation equal to that of this rim. These properties are favorable to the stability of the balancing in accordance with the speed, at the same time as the deformations in directions perpendicular to those of the arms are reduced.

In addition, these arms are distributed along the hub and the rim in accordance with an arrangement and a number which appears best as a function of the problem to be resolved.

They may advantageously be wound of crossed fibers on a mandrel and coated in resin in order to improve their resistance to the axial holding forces of the rim.

The application of rotors of large size of composite materials, endowed with large rim thickness relative to the radius, renders the solution of the static and dynamic balancing problem very difficult throughout the whole range of rotary speed and the invention will now provide a solution to this problem.

Referring to FIG. 2, it can be seen that the localized masses 30a and 31a of the arm 3a are linked together by a junction element 7' which passes through an opening formed in the hub 2 and that this element can act differentially on the radial resultant of the forces applied to these masses.

Due to the fact of its small relative diameter with respect to that of the rim, the hub is subjected to weak centrifugal stresses and may, through this fact accept machined apertures of small size, which is the case of the passage of the junction element 7'.

This junction element is under zero or weak tension when the rim is at rest but in the course of rotation it undergoes, besides its own centrifugal stresses, those resulting from the traction of the localized masses 30a, 31a which should, for this reason, be dimensioned accordingly.

In the axial zone, the junction element 7' is made fast to a threaded portion of element 8 which passes into a nut fast to a tangential wheel 9, worm screw 10 system.

This tangential wheel will, under the effect of the worm screw 10 driven by a motor (not shown), displace the element 8 in one direction or the other according to its own direction of rotation defined from suitable balancing sensors 11-12 of the inductive or capacitative type, for example.

It is to be noted that the balance-actuating devices are situated in a central portion of the hub and hence in a zone where the centrifugal accelerations are weak.

In addition, the driving power and the control signals of the motors pass from the stator portion of the installation to the rotor through a transformer with a fixed primary and rotary secondary without mechanical or electrical contact between the rotor and stator. Any other LF or HF coupling system could, of course, be contemplated.

In summary, the invention is applied more particularly, but not exclusively, to rotors of large size in uses directed to the storage and restitution from a fraction of a kilowatt hour to several megawatt hours in fixed or movable installations, whether or not integrated with electrical distribution networks.

Although the above-mentioned magnetic bearings are particularly suitable for very extended uses without intervention, it may be contemplated to substitute for them more conventional means such as ball-bearings or fluid bearings, gas, oil or again self-lubricating bearings such as silver doped polyimide, for example.

In general, the present invention has only been described and shown by way of preferential example and equivalents could be introduced into its constituent elements according to the sector of activity without however departing from the scope of the invention, which is defined in the appended claims.

Thus, in the case of the utilization of the filamentary material in wires or strips, this material could be buried in a material having a low elastic modulus and a high coefficient of elasticity.

I claim:
1. Inertial method enabling the centering of a circular rim on its hub to be ensured, said method consisting of:
connecting the hub to the rim by means of at least one linking arm with two branches;
conforming said linking arm so that masses of a very dense material are localized at the ends of its branches and its branches pass around said hub;
said masses acting inertially, under the action of centrifugal force, to ensure the holding fast by pressure of each branch against the rim as well as the making fast by pressure of said branches against the hub;
keeping the circularity of said rim constant, throughout the whole range of rotary speeds, by means of other masses distributed against the rim, between the arms and acting under the effect of centrifugal force;
ensuring the longitudinal rigidity as well as the longitudinal mechanical strength of the rim by an aniso- tropic conformation of the material constituting said distributed masses;

and effecting static and dynamic balancing of the rim, arm, and hub assembly by electro-mechanical means responsive to sensor means acting differentially on said masses localized at the ends of the branches of the linking arm.

2. Inertial method according to claim 1, wherein the linking arm is conformed in an anisotropic material so that the branches pass around the hub.

3. Inertial method according to claim 1, wherein the linking arm is conformed so that its branches pass around said localized masses.

4. Inertial method according to claim 1, wherein said electro-mechanical means acting differentially on the localized masses are arranged in the zone of the rotary axis, within the hub.

5. Inertial rotary device enabling the centering of a circular rim on its hub to be ensured, comprising: a rim, a hub, at least one linking arm with two branches between the rim and the hub; masses of a very dense material localized at the ends of said at least one linking arm; anisotropic masses distributed against the rim, between the ends of said arm in contact with the rim; electro-mechanical balancing action means and sensors, said rim, hub, linking arm, localized masses, distributed masses, electro-mechanical means and sensors being arranged so as: to permit the holding fast by pressure of the ends of the arms on the rim and the holding fast by pressure of the branches of each arm against the hub by means of the inertial action of the localized masses, under the effect of centrifugal force; keeping the circularity of the rim constant by means of the inertial action of the distributed masses, under the effect of centrifugal force; ensuring the longitudinal rigidity and the longitudinal mechanical strength of the rim, by means of the anisotropic conformation of the material constituting the distributed masses; and obtaining the static and dynamic balancing of the rim, arm, hub assembly by the effect of the electro-mechanical means acting differentially on the localized masses from sensors.

6. Rotary device according to claim 5, wherein the rim is constituted of an anisotropic material.

7. Rotary device according to claim 5, wherein the rim is of the monolithic type.

8. Rotary device according to claim 5, wherein the anisotropy of the distributed masses is effected by a particular arrangement of coated woven material according to which the composite has high mechanical strength in a direction parallel to the axis of rotation.

9. Rotary device according to claim 8, wherein the coating binder has a relatively low modulus so as to constitute in the directions other than longitudinal a flexible material.

10. Rotary device according to claim 5, wherein said electro-mechanical means with balancing action include a junction element for the localized masses passing through the hub, said element being provided at its central portion, with a threaded portion engaged in a nut forming a tangential wheel driven by a motorized worm screw so that the direction of rotation of said tangential wheel determines the direction of the differential action to be applied to the localized masses to modify the resultant of the radial forces to which they are subjected.

11. Rotary device according to claim 10, wherein the sensors deliver signals which actuate the balancing motor in the desired direction.

* * * * *